US009284055B2

(12) United States Patent
Beroth et al.

(10) Patent No.: US 9,284,055 B2
(45) Date of Patent: Mar. 15, 2016

(54) VEHICLE SEAT WITH SIMULTANEOUS ARTICULATION OF SEAT PAN AND SEAT BACK

(71) Applicant: B/E Aerospace, Inc., Wellington, FL (US)

(72) Inventors: Michael Beroth, Winston-Salem, NC (US); Dan Udriste, Coral Springs, FL (US); Javier Valdes De La Garza, Miami, FL (US)

(73) Assignee: B/E Aerospace, Inc., Wellington, FL (US)

( * ) Notice: Subject to any disclaimer, the term of this patent is extended or adjusted under 35 U.S.C. 154(b) by 120 days.

(21) Appl. No.: 14/247,850

(22) Filed: Apr. 8, 2014

(65) Prior Publication Data

US 2014/0300145 A1    Oct. 9, 2014

Related U.S. Application Data

(60) Provisional application No. 61/809,491, filed on Apr. 8, 2013.

(51) Int. Cl.
| | |
|---|---|
| *B64D 11/06* | (2006.01) |
| *B60N 2/23* | (2006.01) |
| *B60N 2/22* | (2006.01) |
| *B60N 2/34* | (2006.01) |
| *B60N 2/44* | (2006.01) |
| *B64D 11/00* | (2006.01) |

(52) U.S. Cl.
CPC .......... *B64D 11/0643* (2014.12); *B60N 2/2209* (2013.01); *B60N 2/231* (2013.01); *B60N 2/34* (2013.01); *B60N 2/4495* (2013.01); *B64D 11/06* (2013.01); *B64D 11/0647* (2014.12); *B64D 2011/0069* (2013.01)

(58) Field of Classification Search
CPC ........ B60N 2/34; B60N 2/4495; B64D 11/06; B64D 11/064; B64D 11/0641; B64D 11/0643
USPC ................ 297/83, 84, 88, 317, 318, 321, 322
See application file for complete search history.

(56) References Cited

U.S. PATENT DOCUMENTS

| | | | |
|---|---|---|---|
| 5,318,341 A | 6/1994 | Griswold et al. | |
| 5,435,625 A | 7/1995 | Weber | |
| 5,636,898 A | 6/1997 | Dixon et al. | |
| 6,059,364 A | * 5/2000 | Dryburgh ............. | A47C 1/0352 105/322 |
| 6,170,786 B1 | * 1/2001 | Park ..................... | B60N 2/0232 297/188.16 |

(Continued)

OTHER PUBLICATIONS

International Search Report for PCT/US14/33326 dated Aug. 24, 2014.

*Primary Examiner* — Peter Brown
(74) *Attorney, Agent, or Firm* — Shumaker, Loop & Kendrick, LLP (57) ABSTRACT

A vehicle seat that includes a linkage assembly interconnecting a seat pan assembly, seat back assembly and leg rest assembly whereby, as the seat carriage assembly is moved aft the seat pan assembly and the seat back assembly simultaneously adjust to maintain a predetermined seating position during an initial recline motion with the leg rest assembly remaining in a retracted position below the seat pan assembly. The leg rest assembly progressively elevates into a leg-supporting position during a subsequent recline motion as the back rest assembly and seat pan assembly progressively recline towards a lie-flat configuration.

17 Claims, 8 Drawing Sheets

(56) References Cited

U.S. PATENT DOCUMENTS

| | | | |
|---|---|---|---|
| 6,227,489 B1 * | 5/2001 | Kitamoto | B64D 11/00 244/118.5 |
| 6,412,870 B1 * | 7/2002 | Higgins | B60N 2/34 297/342 |
| 6,692,069 B2 | 2/2004 | Beroth et al. | |
| 7,182,402 B1 | 2/2007 | Ahad | |
| 7,475,944 B2 * | 1/2009 | Griepentrog | A47C 17/175 297/328 |
| 8,403,415 B2 * | 3/2013 | Lawson | B64D 11/06 297/318 |
| 8,733,840 B2 * | 5/2014 | Westerink | B64D 11/06 297/316 |
| 8,827,938 B2 * | 9/2014 | Fukuyama | A61H 1/00 297/84 |
| 2002/0109385 A1 | 8/2002 | Marechal et al. | |
| 2003/0075962 A1 * | 4/2003 | Saltzer | B60N 2/34 297/321 |
| 2003/0094842 A1 | 5/2003 | Williamson | |
| 2004/0036336 A1 | 2/2004 | Veneruso | |
| 2007/0262625 A1 | 11/2007 | Dryburgh et al. | |
| 2010/0253129 A1 * | 10/2010 | Dowty | B60N 2/4495 297/85 M |
| 2012/0038196 A1 | 2/2012 | Lawson | |
| 2012/0139300 A1 | 6/2012 | Marais et al. | |
| 2012/0228919 A1 | 9/2012 | Dowty et al. | |

* cited by examiner

VEHICLE SEAT WITH SIMULTANEOUS ARTICULATION OF SEAT PAN AND SEAT BACK

CROSS REFERENCE TO PREVIOUSLY-FILED APPLICATION

This patent application claims priority to U.S. Provisional Patent Application Ser. No. 61/809,491, filed Apr. 8, 2013.

TECHNICAL FIELD AND BACKGROUND OF THE INVENTION

The present invention relates to a vehicle seat, such as an aircraft passenger seat, that has improved motion intended to provide greater passenger comfort. In premium class seating areas seats often have "lie flat" or "near lie flat" characteristics that allow passengers to move from a full upright taxi, takeoff and landing ("TTOL") position to a prone position suitable for resting or sleeping, with intermediate positions between these two extremes. As prior art seats move from a full upright position, the rear end of the seat pan tilts downwardly and the front of the seat pan rises, and along with it, the fixed leg rest, raising the passenger's feet off of the aircraft deck.

It is known that passengers seldom want the seat bottom to move to a more angled position without the seat back also reclining, and prior art seats also raise the feet to maintain the same relative body angle as the seat back reclines.

Therefore, there is a need for a passenger seat that provides a more comfortable and space-efficient seat. Newer aircraft seats in premium seating areas of the cabin must have more amenities and features and must be more adjustable, including seat pan angle and substantially-flat reclining functionality, thereby providing a passenger with additional in-flight comfort. While an aircraft operator may want to provide its passengers with amenities such as adjustable seats, prior art aircraft seats with moveable seat back and seat pan presented aircraft operators with a challenge of simultaneously angling the seat pan and seat back, and combining the recline function into a more comfortable motion.

SUMMARY OF THE INVENTION

Therefore, it is an object of the invention to provide a vehicle seat that maintains a comfortable angle between the seat back and seat bottom during an initial recline motion while simultaneously maintaining the leg rest in a position allowing the feet to remain on a support surface such as an aircraft deck.

It is a further object of the invention to provide an aircraft passenger seat that provides seat pan articulation so that the seat back and seat pan rotate simultaneously around a forward pivot. This motion does not raise the passenger's feet off the floor and enhances seat adjustment and passenger comfort.

It is a further object of the invention to provide an aircraft passenger seat that provides seat pan articulation so that the seat back and seat pan rotate simultaneously around a forward pivot during a subsequent recline motion that permits the passenger to further recline as the feet and legs are elevated.

These and other objects and advantages of the present invention are achieved by providing a vehicle seat that includes a seat carriage assembly for being mounted on a supporting deck for fore and aft movement on the deck, a seat pan assembly mounted on the seat carriage assembly for fore and aft movement relative to the seat carriage assembly, and a seat back assembly mounted on the seat carriage assembly aft of the seat pan assembly and adapted for simultaneous motion with the seat pan assembly. A leg rest assembly is mounted on the seat carriage assembly forward of the seat pan, and the seat carriage assembly includes a linkage assembly interconnecting the seat pan assembly, seat back assembly and leg rest assembly. As the seat carriage assembly is moved aft relative to the deck on which the seat is mounted, the seat pan assembly and the seat back assembly simultaneously adjust to maintain a predetermined seating position during an initial recline motion with the leg rest assembly remaining in a retracted position below the seat pan assembly. The leg rest assembly progressively elevates into a leg-supporting position during a subsequent recline motion as the back rest assembly and seat pan assembly progressively recline towards a lie-flat configuration.

According to another embodiment of the invention, the initial position of the aircraft passenger seat is a TTOL configuration, with a forward surface of the seat back assembly positioned at an approximate right angle to an upper surface of the seat pan assembly.

According to another embodiment of the invention, a head rest assembly is positioned on a top end of the seat back assembly, a forward surface of the head rest assembly is anatomically aligned with a forward surface of the seat back assembly, and a forward surface of the leg rest assembly is at an approximate right angle to the upper surface of the seat pan assembly and the deck.

According to another embodiment of the invention, during the initial recline motion the seat back assembly is tilted aft and a forward edge of the seat pan assembly tilts upward to maintain an approximate right angle position between the forward surface of the seat back assembly and the upper surface of the seat pan assembly.

According to another embodiment of the invention, the seat pan assembly includes a seat pan, a seat pan frame, a forward seat pan pivot arm and an aft seat pan pivot arm interconnecting an upper seat support frame and a fore and aft translatable slide rail assembly.

According to another embodiment of the invention, the seat includes a seat pan carried on a seat pan frame, a forward seat pan pivot arm and an aft pivot arm interconnecting an upper seat support frame and a fore and aft translatable slide rail assembly forming to form a four-bar linkage that interacts to permit the desired motion of the seat pan assembly, seat back assembly, and leg rest assembly.

According to another embodiment of the invention, the movement of the seat is powered by a linear hydraulic locking device that is connected to the seat back assembly by a crank link and to the seat pan assembly by attachment to the upper seat support frame through an upper seat support frame link.

According to another embodiment of the invention, the hydraulic locking device comprises a piston and cylinder assembly.

According to another embodiment of the invention, the seat carriage assembly is mounted for movement on a translatable slide rail assembly powered by a slide rail piston and cylinder assembly.

According to another embodiment of the invention, an aircraft passenger seat is provided, and includes a seat carriage assembly for being mounted on a supporting deck for fore and aft movement on the deck, a seat pan assembly mounted on the seat carriage assembly for fore and aft movement relative to the seat carriage assembly and a seat back assembly mounted on the seat carriage assembly aft of the seat pan assembly and adapted for simultaneous motion with the seat pan assembly wherein an initial position of the aircraft passenger seat is a TTOL configuration, with a forward surface of the seat back assembly positioned at an approximate right angle to an upper surface of the seat pan assembly. A leg rest assembly is mounted on the seat carriage assembly forward of the seat pan. The seat carriage assembly includes a linkage assembly interconnecting the seat pan assembly, seat back assembly and leg rest assembly whereby, as the seat carriage assembly is moved aft relative to the deck on which the seat is mounted, the seat pan assembly and the seat back assembly simultaneously adjust to maintain a predetermined seating position during an initial recline motion with the leg rest assembly remaining in a retracted position below the seat pan assembly wherein during the initial recline motion the seat back assembly is tilted aft and a forward edge of the seat pan assembly tilts upward to maintain an approximate right angle position between the forward surface of the seat back assembly and the upper surface of the seat pan assembly. The leg rest assembly progressively elevates into a leg-supporting position during a subsequent recline motion as the back rest assembly and seat pan assembly progressively recline towards a lie-flat configuration.

According to another embodiment of the invention, an aircraft passenger seat is provided that includes a seat carriage assembly for being mounted on a supporting deck for fore and aft movement on the deck and a seat pan assembly mounted on the seat carriage assembly for fore and aft movement relative to the seat carriage assembly. The seat pan assembly includes a seat pan, a seat pan frame, a forward seat pan pivot arm and an aft seat pan pivot arm interconnecting an upper seat support frame and a fore and aft translatable slide rail assembly. A seat back assembly is mounted on the seat carriage assembly aft of the seat pan assembly and adapted for simultaneous motion with the seat pan assembly. The initial position of the aircraft passenger seat is a TTOL configuration, with a forward surface of the seat back assembly positioned at an approximate right angle to an upper surface of the seat pan assembly. A leg rest assembly is mounted on the seat carriage assembly forward of the seat pan, and the seat carriage assembly includes a linkage assembly interconnecting the seat pan assembly, seat back assembly and leg rest assembly. As the seat carriage assembly is moved aft relative to the deck on which the seat is mounted, the seat pan assembly and the seat back assembly simultaneously adjust to maintain a predetermined seating position during an initial recline motion with the leg rest assembly remaining in a retracted position below the seat pan assembly wherein during the initial recline motion the seat back assembly is tilted aft and a forward edge of the seat pan assembly tilts upward to maintain an approximate right angle position between the forward surface of the seat back assembly and the upper surface of the seat pan assembly. The leg rest assembly progressively elevates into a leg-supporting position during a subsequent recline motion as the back rest assembly and seat pan assembly progressively recline towards a lie-flat configuration.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Referring now specifically to the drawings, assembled structural elements of a vehicle seat 10 are illustrated. As shown in FIGS. 1-4, the major structural elements are a seat pan assembly 12, seat back assembly 14, head rest assembly 16, leg rest assembly 18, and a carriage assembly 20 on which the other major structural elements are mounted. The carriage assembly 20 is adapted to be fixed to a supporting surface such as an aircraft deck for fore and aft movement, as with transversely-extending frame tubes 19. Extraneous elements such as arm rests and the like are also shown. The illustrated embodiment is of an aircraft passenger seat, but the invention has application to other types of vehicle seating.

Figure 1:
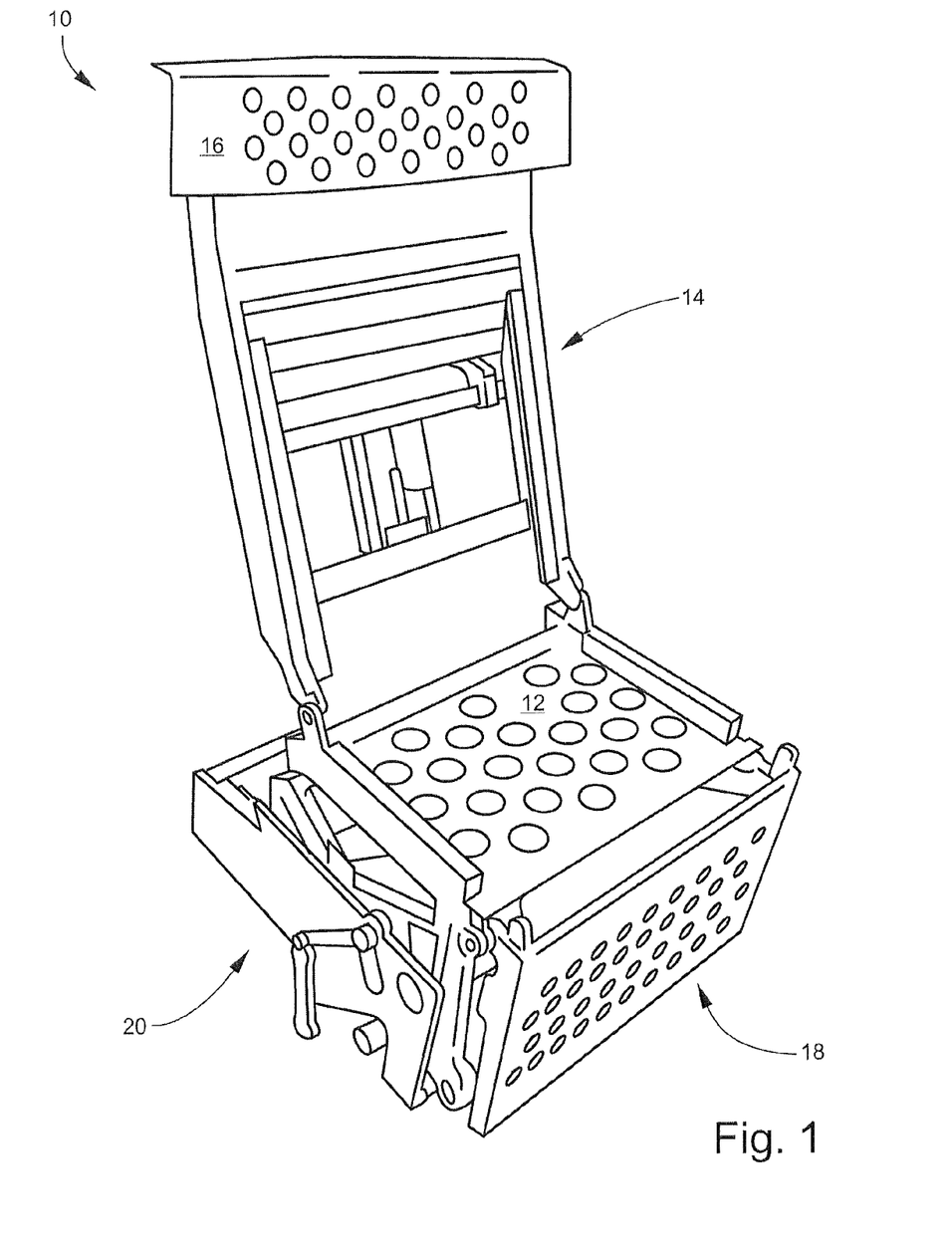
FIG. 1 is a perspective view of an aircraft passenger seat frame according to an embodiment of the invention in the full upright TTOL position.

FIGS. 1-4 broadly illustrate the novel movement sequence as applied to the particular illustrated seat 10. As shown in FIG. 1, the initial position of the aircraft passenger seat 10 is a TTOL configuration, with the forward surface of the seat back assembly 14 at an approximate 90 degree angle to the upper surface of the seat pan assembly 12. The forward surface of the head rest assembly 16 is anatomically aligned with the forward surface of the seat back assembly 14 and the forward surface of the leg rest assembly 18 is at an approximate right angle to the upper surface of the seat pan assembly 12 and perpendicular to the horizontal pallet on which it is positioned. The seating position dictated by this position is designed to provide comfort when the passenger desires an upright seated position as well as the safety requirements of TTOL events.

Figure 2:
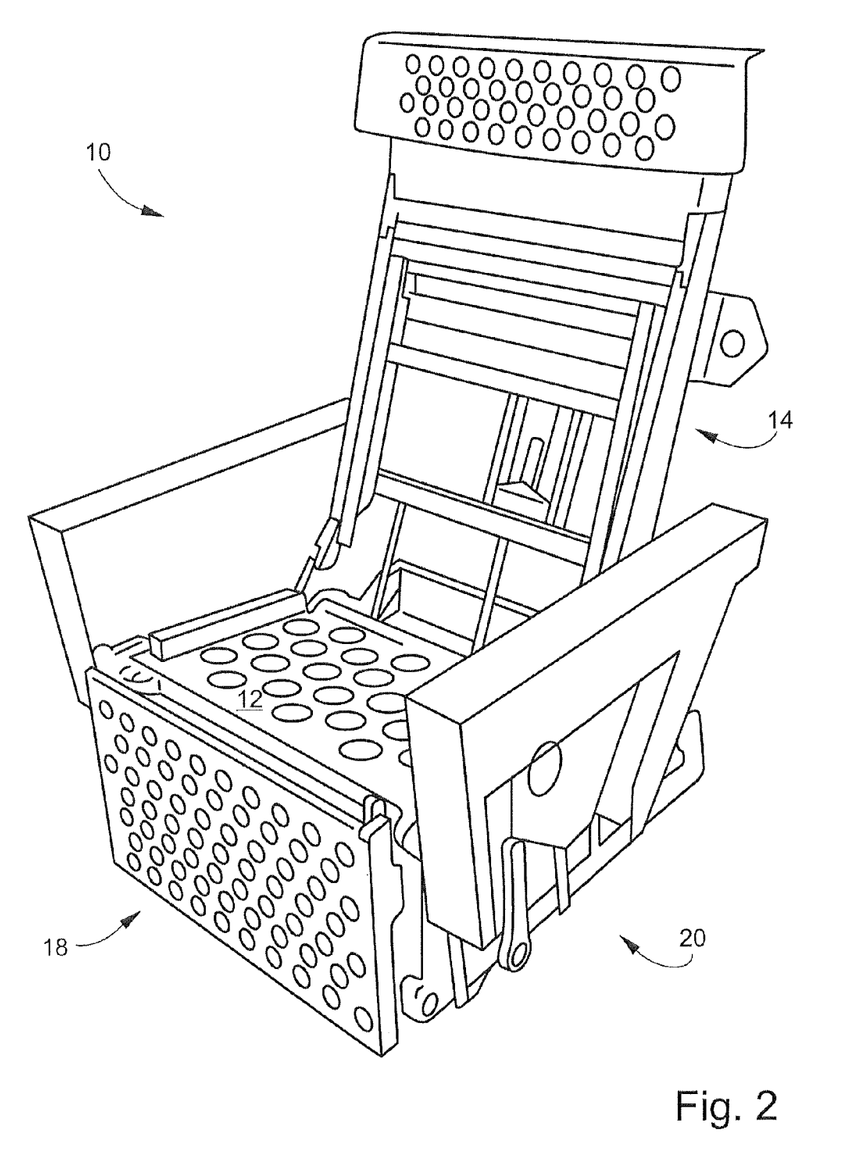
FIG. 2 is a perspective view of an aircraft passenger seat frame according to an embodiment of the invention in an initial recline position.

As shown in FIG. 2, seat 10 can be moved to a slightly reclined position in which the seat back assembly 14 is tilted back and forward edge of the seat pan 12 tilts upward slightly in order to maintain a comfortable sitting position. Note, however, that the leg rest assembly 18 remains in its upright position perpendicular to the floor. This feature has not previously been used in seating of this type, and the feature results from the observation that when passengers are only slightly reclined they prefer to have their feet still resting on the floor. Thus, the angle between the seat pan assembly 12 and the leg rest assembly 18 is now at an acute angle.

Figure 3:
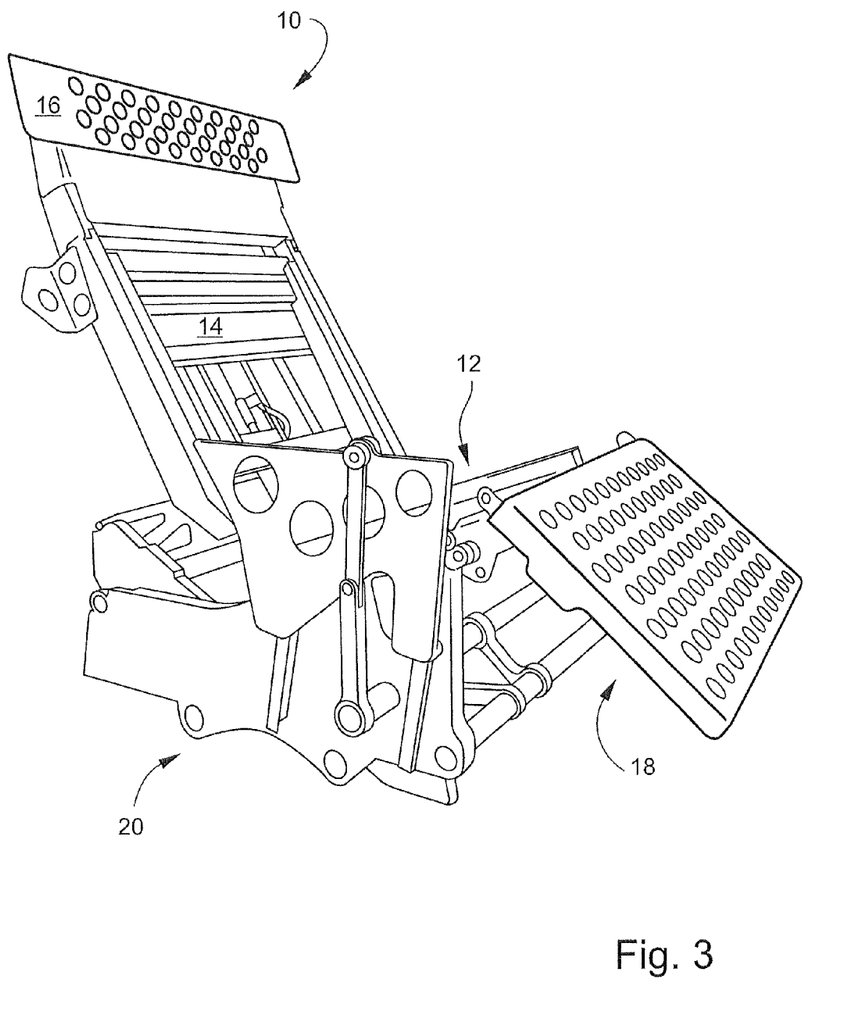
FIG. 3 is a perspective view of an aircraft passenger seat frame according to an embodiment of the invention in a further recline position with a raised leg rest.
Figure 4:
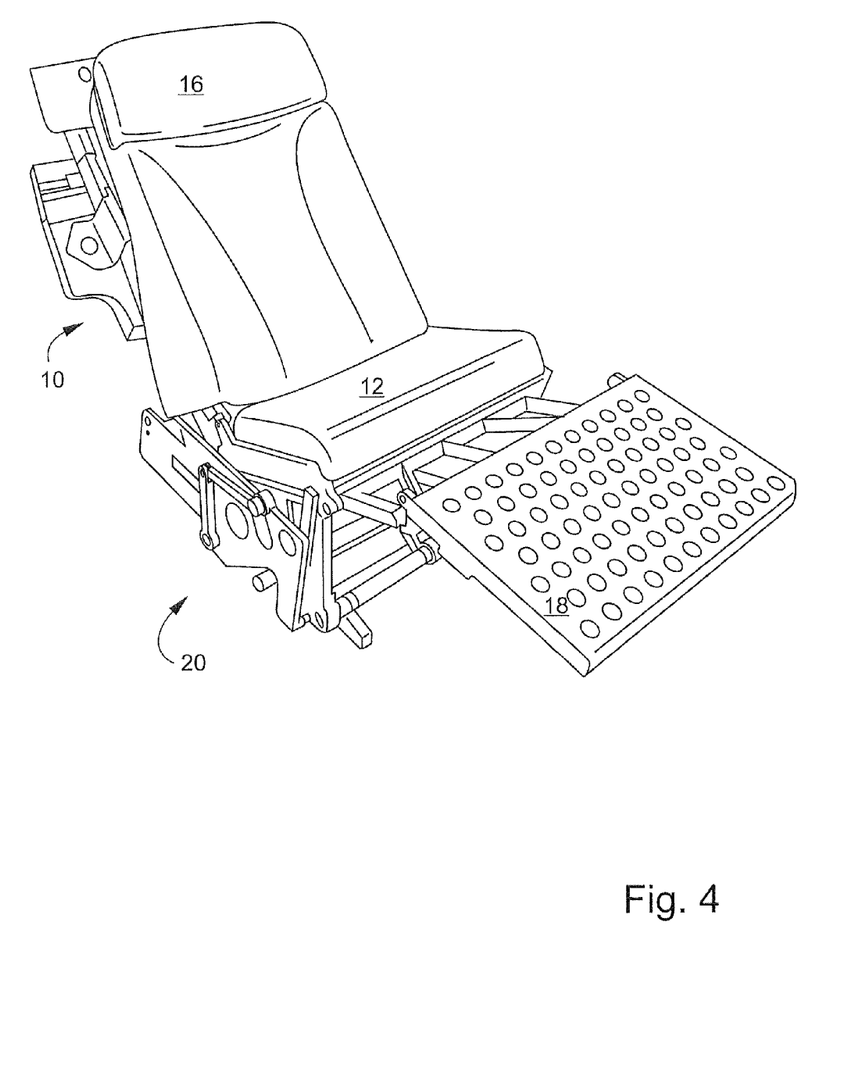
FIG. 4 is a perspective view of an aircraft passenger seat frame according to an embodiment of the invention in a further reclined position.
Figure 8:
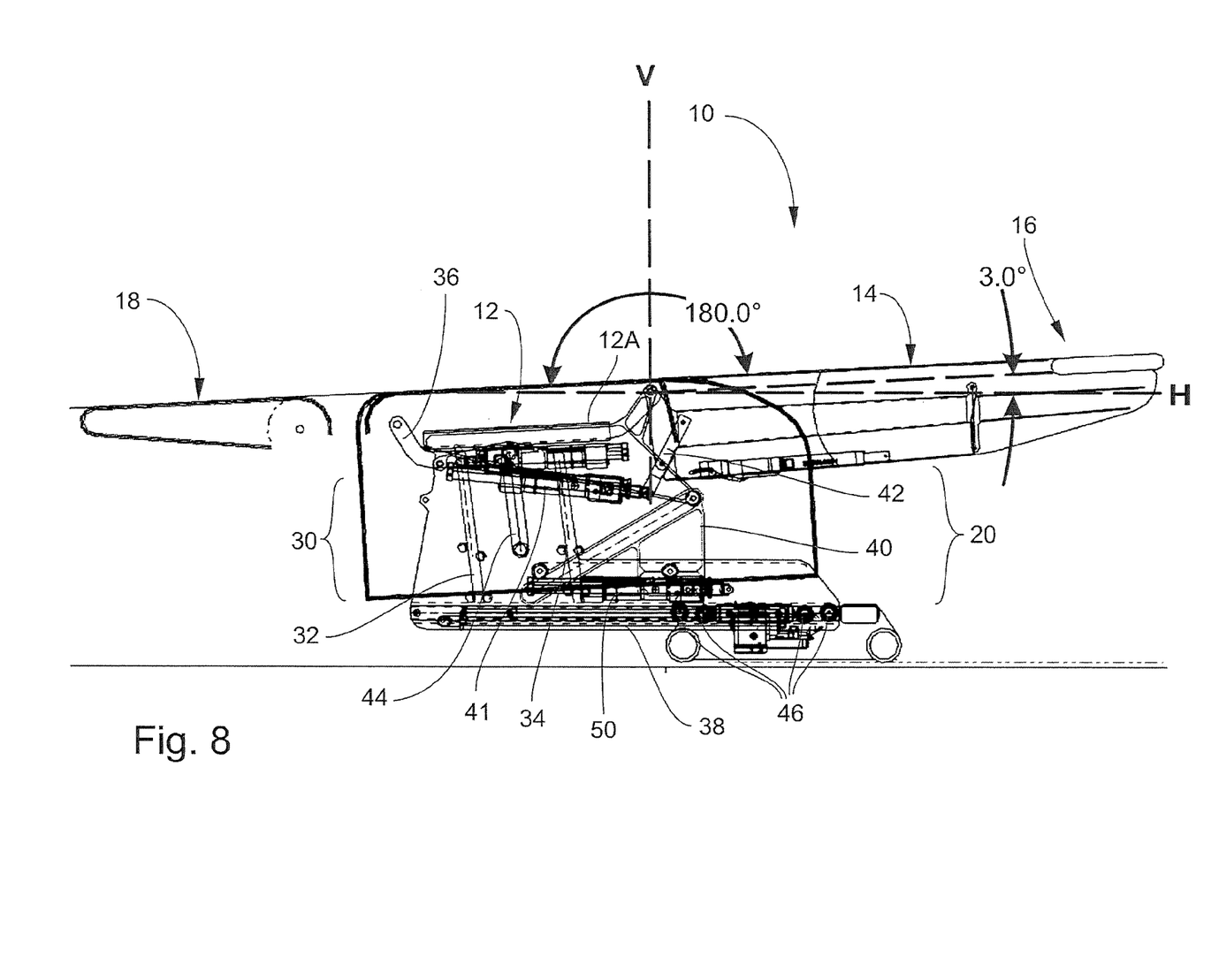

Referring now to FIG. 3, as the seat 10 continues its recline motion, the seat back assembly 14 tilts further back, and simultaneously the forward edge of the seat pan assembly 12 tilts progressively further upward and the leg rest assembly 18 begins to pivot upward around a pivot point just forward of the front edge of the seat pan 12. The angle between the seat back assembly 14 and the seat pan assembly 12 opens into an obtuse angle and the angle between the seat pan assembly 12 and the leg rest assembly begin to straighten. As is shown in FIG. 4, this progressive and simultaneous recline process continues. Note the relationship between the seat pan assembly 12 and the leg rest assembly 18. As shown in FIG. 8, in its final lie flat position, the leg rest assembly 18, the seat pan assembly 12 and the seat back assembly 14 have moved into a planar position in relation to each other.

Figure 5:
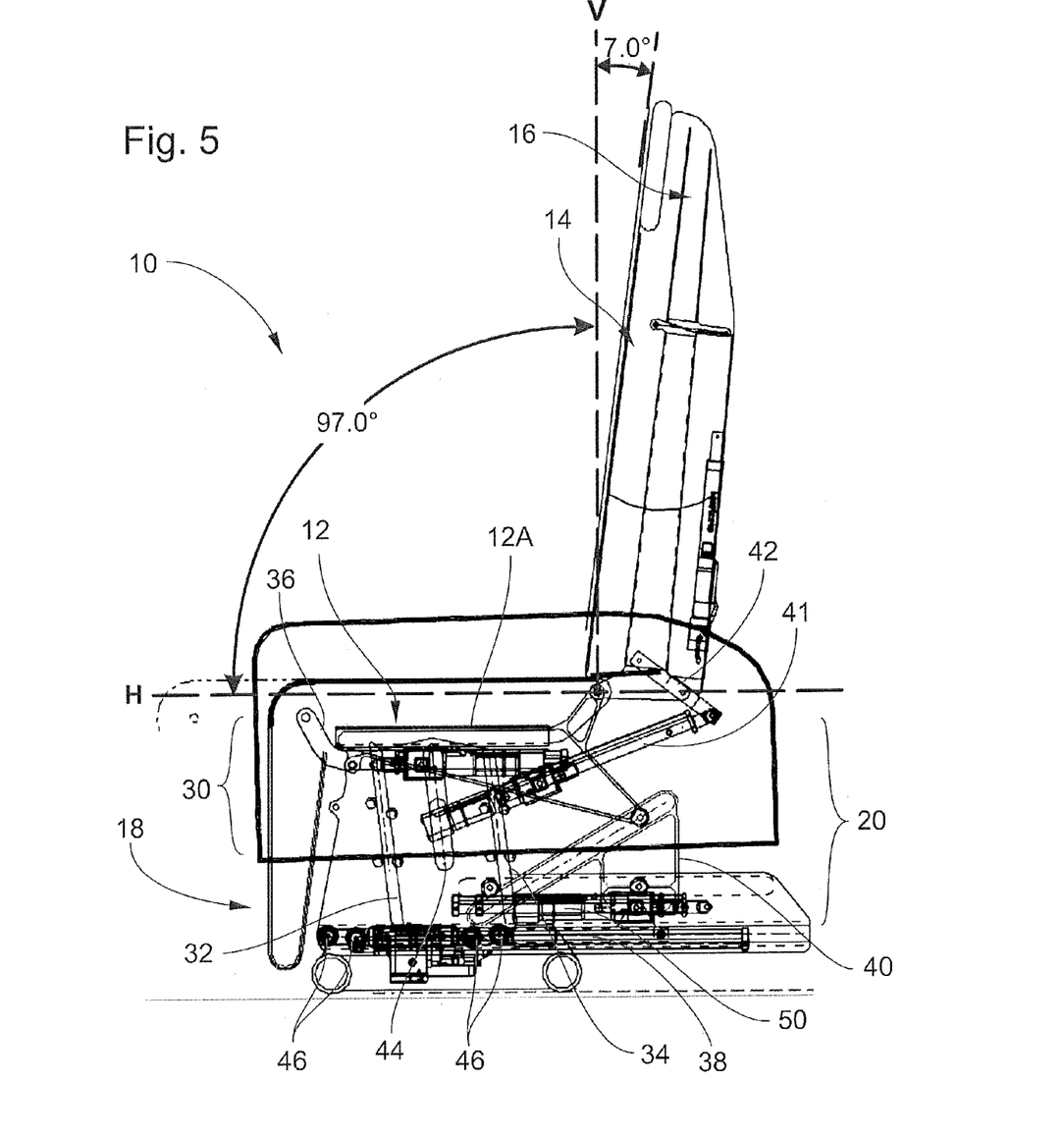
FIGS. 5-8 are side elevation wire frame views of an aircraft passenger seat frame according to an embodiment of the invention in upright, initial recline position, further recline position and lie flat positions, respectively.

Referring now to FIGS. 5-8, wire frame side elevations of the seat 10 are shown in sequence, and by observing the seat assembly positions sequentially from FIGS. 5 to 8 and from FIGS. 8 to 5, an accurate representation of the recline and return to TTOL positions can be observed. The same assemblies shown in FIGS. 1-4 are shown in FIGS. 5-8 at the same broad reference numerals.

As shown in FIG. 5, the seat pan assembly 12 includes a seat pan 12A and a seat pan frame 30. A forward seat pan pivot arm 32 and an aft pivot arm 34 interconnect an upper seat support frame 36 and a fore and aft translatable slide rail assembly 38. These components form a four-bar linkage that interacts to permit the desired motion of the seat pan assembly 12, seat back assembly 14 and leg rest assembly 16.

Figure 6:
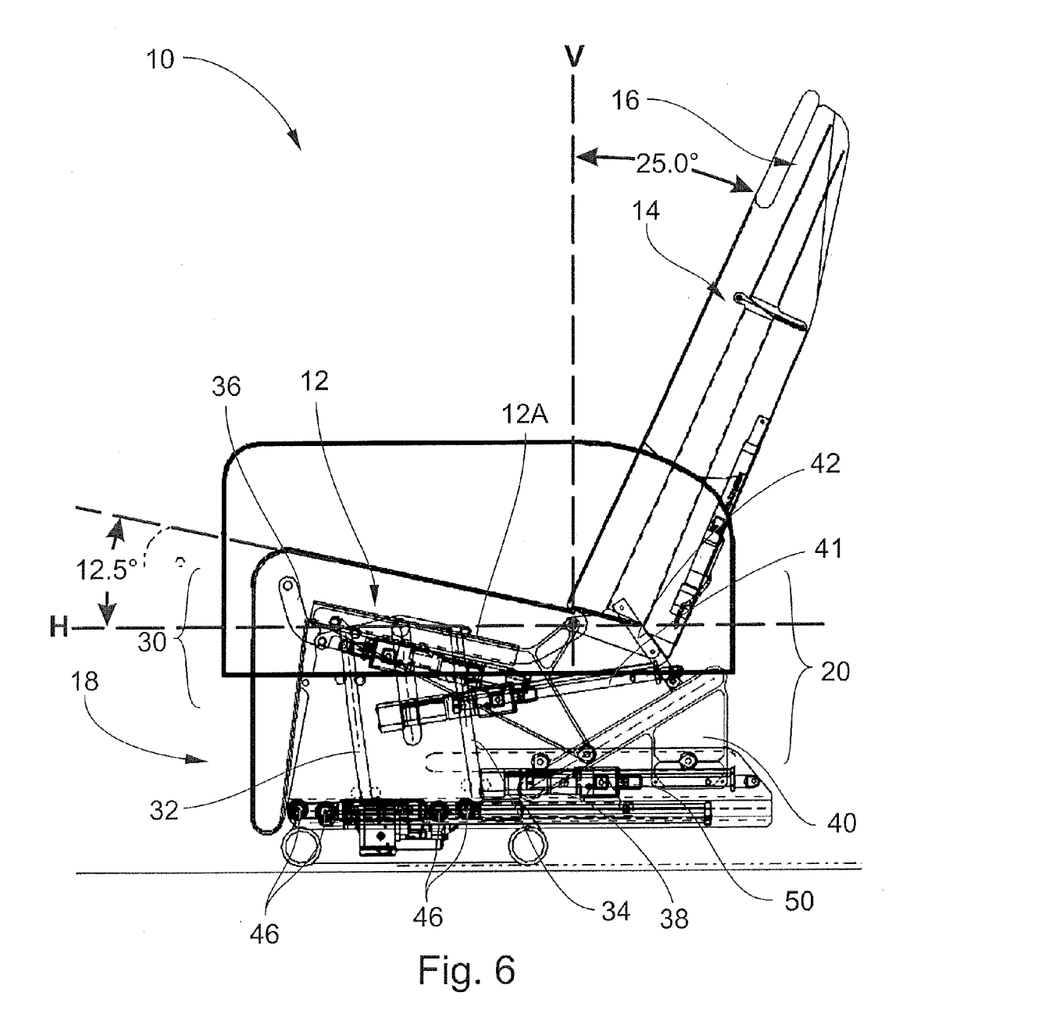
Figure 7:
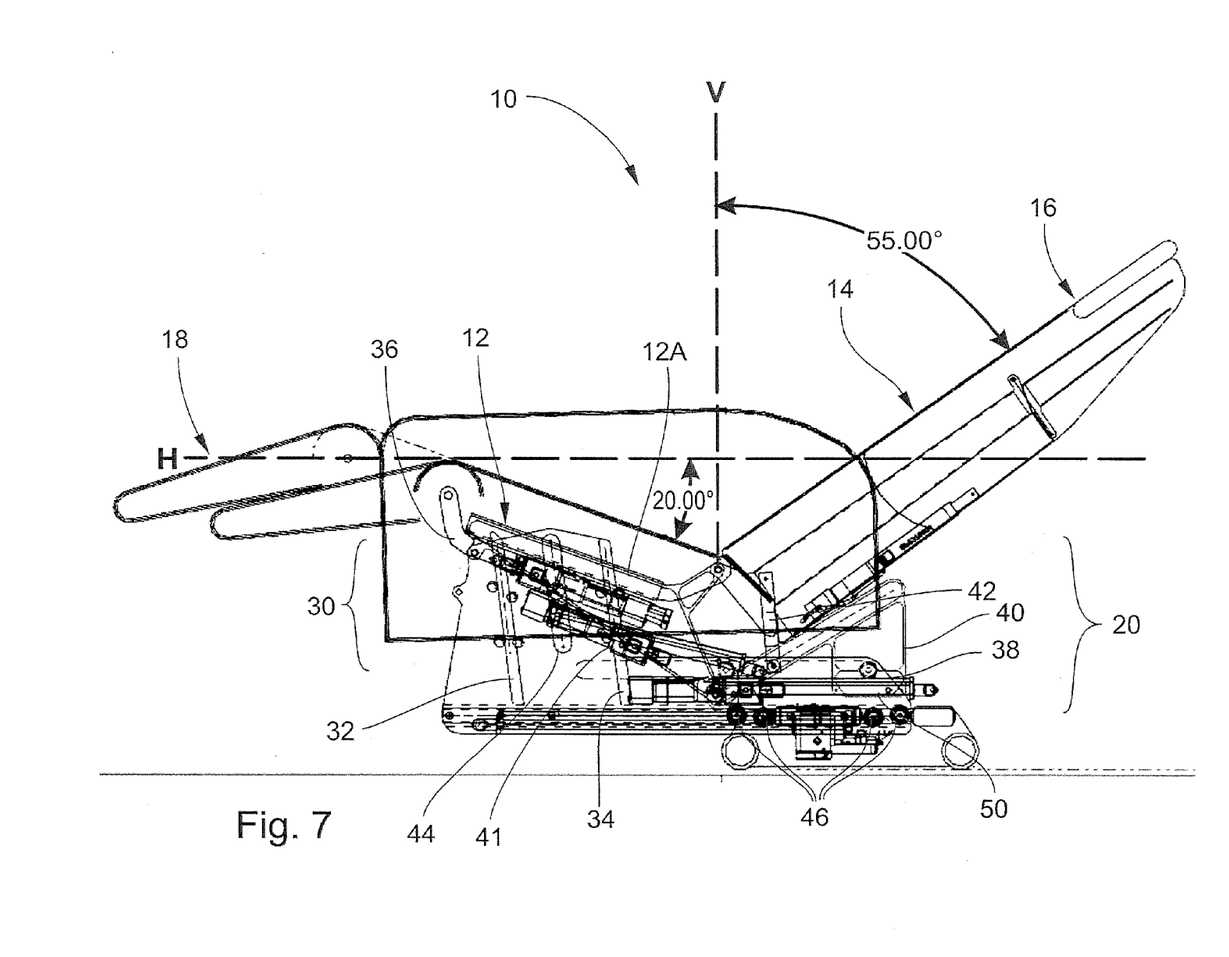

A carriage 40 is mounted to the upper seat support frame 36 and, as shown in FIG. 6, changes the angle of the back rest assembly 14 and the seat pan assembly 12 simultaneously in accordance with the invention. The leg rest assembly 18 remains stationary during an initial phase of the recline motion, and is rotated upwardly during a subsequent phase of this motion. Compare FIGS. 5 and 6 with FIGS. 7 and 8.

The seat 10 is powered by a linear hydraulic locking device such as a Hydrolok brand piston and cylinder assembly 41 that is connected to the seat back assembly 14 by a crank link 42 and the seat pan assembly by attachment to the upper seat support frame 36 through a link 44.

The entire seat 10 is mounted for fore and aft movement on the carriage 40 by ball bearing rollers 46 traversing the slide rail assembly 38. This motion is controlled by a piston and cylinder assembly 50 mounted parallel to the slide rail assembly 38.

A vehicle seat with simultaneous articulation of fore and aft ends of seat pan according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A vehicle seat, comprising:
   (a) a seat carriage assembly for being mounted on a supporting deck for fore and aft movement on the deck, and including a four-bar linkage having a forward seat pan pivot arm, an aft pivot arm, an upper support frame and a fore and aft translatable slide rail assembly;
   (b) a seat pan assembly including a seat pan mounted for movement on the forward seat pan pivot arm and the aft pivot arm of the seat carriage assembly for fore and aft movement relative to the seat carriage assembly;
   (c) a seat back assembly mounted on a pivotable crank link interconnecting the seat pan assembly and the seat back assembly on the seat carriage assembly aft of the seat pan assembly for enabling simultaneous motion of the seat back assembly with the seat pan assembly by the interconnection of the crank link;
   (d) a leg rest assembly pivotally-mounted on the seat carriage assembly forward of the seat pan;
   (e) the four-bar linkage assembly interconnecting the seat pan assembly, seat back assembly and leg rest assembly whereby, as the seat carriage assembly is moved aft relative to the deck on which the seat is mounted;
      (i) the seat pan assembly and the seat back assembly simultaneously adjust through the four-bar linkage to maintain a predetermined seating position during an initial recline motion with the leg rest assembly remaining in a retracted position below the seat pan assembly; and
      (ii) the four-bar linkage progressively elevates the leg rest assembly into a leg-supporting position during a subsequent recline motion as the back rest assembly and seat pan assembly progressively recline towards a lie-flat configuration.

2. A vehicle seat according to claim 1, wherein an initial position of the vehicle seat is a TTOL configuration, with a forward surface of the seat back assembly positioned at an approximate right angle to an upper surface of the seat pan assembly and the vehicle seat includes a head rest assembly positioned on a top end of the seat back assembly, wherein a forward surface of the head rest assembly is laterally aligned with a forward surface of the seat back assembly, and a forward surface of the leg rest assembly is at an approximate right angle to the upper surface of the seat pan assembly and the deck.

3. A vehicle seat according to claim 1, wherein the seat pan assembly includes a seat pan, and a seat pan frame mounted for movement on the four-bar linkage, wherein the four-bar linkage comprises a forward seat pan pivot arm and an aft seat pan pivot arm respectively interconnecting an upper seat support frame and a fore and aft translatable slide rail assembly.

4. A vehicle seat according to claim 3, wherein movement of the seat is powered by a linear hydraulic locking device that is connected to the four-bar linkage of the seat back assembly by a crank link and to the seat pan assembly by attachment of the four-bar linkage to the upper seat support frame through an upper seat support frame link.

5. A vehicle seat according to claim 4, wherein the hydraulic locking device comprises a piston and cylinder assembly.

6. A vehicle seat according to claim 1, wherein the seat carriage assembly is mounted for movement on a translatable slide rail assembly powered by a slide rail piston and cylinder assembly.

7. A vehicle seat according to claim 1, wherein during the initial recline motion the seat back assembly is tilted aft and a forward edge of the seat pan assembly tilts upward to maintain an approximate right angle position between the forward surface of the seat back assembly and the upper surface of the seat pan assembly.

8. An aircraft passenger seat, comprising:
   (a) a seat carriage assembly for being mounted on a supporting deck for fore and aft movement on the deck, and including a four-bar linkage having a forward seat pan pivot arm, an aft pivot arm, an upper support frame and a fore and aft translatable slide rail assembly;
   (b) a seat pan assembly including a seat pan mounted for movement on the forward seat pan pivot arm and the aft pivot arm of the seat carriage assembly for fore and aft movement relative to the seat carriage assembly;
   (c) a seat back assembly mounted on a pivotable crank link interconnecting the seat pan assembly and the seat carriage assembly aft of the seat pan assembly for enabling simultaneous motion of the seat back assembly with the seat pan assembly by interconnection of the crank link, wherein an initial position of the aircraft passenger seat is a TTOL configuration, with a forward surface of the seat back assembly positioned at an approximate right angle to an upper surface of the seat pan assembly;
   (d) a leg rest assembly pivotally-mounted on the seat carriage assembly forward of the seat pan;
   (e) the four-bar linkage assembly interconnecting the seat pan assembly, seat back assembly and leg rest assembly whereby, as the seat carriage assembly is moved aft relative to the deck on which the seat is mounted;

(i) the seat pan assembly and the seat back assembly simultaneously adjust through the four-bar linkage to maintain a predetermined seating position during an initial recline motion with the leg rest assembly remaining in a retracted position below the seat pan assembly wherein during the initial recline motion the seat back assembly is tilted aft and a forward edge of the seat pan assembly tilts upward to maintain an approximate right angle position between the forward surface of the seat back assembly and the upper surface of the seat pan assembly; and (ii) the four-bar linkage progressively elevates the leg rest assembly into a leg-supporting position during a subsequent recline motion as the back rest assembly and seat pan assembly progressively recline towards a lie-flat configuration.

9. An aircraft passenger seat to claim 8, wherein the seat pan assembly includes a seat pan, and a seat pan frame mounted for movement on the four-bar linkage, wherein the four-bar linkage comprises a forward seat pan pivot arm and an aft seat pan pivot arm respectively interconnecting an upper seat support frame and a fore and aft translatable slide rail assembly.

10. An aircraft passenger seat to claim 8, wherein the seat includes a seat pan carried on a seat pan frame, a forward seat pan pivot arm and an aft pivot arm interconnecting an upper seat support frame and a fore and aft translatable slide rail assembly to form a four-bar linkage that interacts to permit the desired motion of the seat pan assembly, seat back assembly, and leg rest assembly.

11. An aircraft passenger seat to claim 8, wherein movement of the seat is powered by a linear hydraulic locking device that is connected to the four-bar linkage of the seat back assembly by a crank link and to the seat pan assembly by attachment of the four-bark linkage to the upper seat support frame through an upper seat support frame link.

12. An aircraft passenger seat according to claim 11, wherein the hydraulic locking device comprises a piston and cylinder assembly.

13. An aircraft passenger seat according to claim 8, wherein the seat carriage assembly is mounted for movement on a translatable slide rail assembly powered by a slide rail piston and cylinder assembly.

14. An aircraft passenger seat, comprising:
(a) a seat carriage assembly for being mounted on a supporting deck for fore and aft movement on the deck, and including a four-bar linkage having a forward seat pan pivot arm, an aft pivot arm, an upper support frame and a fore and aft translatable slide rail assembly;
(b) a seat pan assembly including a seat pan mounted for movement on the forward seat pan pivot arm of the seat carriage assembly for fore and aft movement relative to the seat carriage assembly, wherein the seat pan assembly includes a seat pan, a seat pan frame, a forward seat pan pivot arm and an aft seat pan pivot arm interconnecting an upper seat support frame and a fore and aft translatable slide rail assembly;
(c) a seat back assembly mounted on a pivotable crank link interconnecting the seat pan assembly and the seat carriage assembly aft of the seat pan assembly for enabling simultaneous motion of the seat back assembly with the seat pan assembly by the interconnection of the crank link, wherein an initial position of the aircraft passenger seat is a TTOL configuration, with a forward surface of the seat back assembly positioned at an approximate right angle to an upper surface of the seat pan assembly;
(d) a leg rest assembly pivotally-mounted on the seat carriage assembly forward of the seat pan;
(e) the four-bar linkage assembly interconnecting the seat pan assembly, seat back assembly and leg rest assembly whereby, as the seat carriage assembly is moved aft relative to the deck on which the seat is mounted;
(i) the seat pan assembly and the seat back assembly simultaneously adjust through the four-bar linkage to maintain a predetermined seating position during an initial recline motion with the leg rest assembly remaining in a retracted position below the seat pan assembly wherein during the initial recline motion the seat back assembly is tilted aft and a forward edge of the seat pan assembly tilts upward to maintain an approximate right angle position between the forward surface of the seat back assembly and the upper surface of the seat pan assembly; and
(ii) the four-bar linkage progressively elevates the leg rest assembly into a leg-supporting position during a subsequent recline motion as the back rest assembly and seat pan assembly progressively recline towards a lie-flat configuration.

15. An aircraft passenger seat according to claim 14, wherein movement of the seat is powered by a linear hydraulic locking device that is connected to the four-bar linkage of the seat back assembly by a crank link and to the seat pan assembly by attachment of the four-bar linkage to the upper seat support frame through an upper seat support frame link.

16. An aircraft passenger seat according to claim 15, wherein the hydraulic locking device comprises a piston and cylinder assembly.

17. An aircraft passenger seat according to claim 14, wherein the seat carriage assembly is mounted for movement on a translatable slide rail assembly powered by a slide rail piston and cylinder assembly.

* * * * *